United States Patent
Okamoto et al.

[15] 3,650,574

[45] Mar. 21, 1972

[54] AUTOMOTIVE ANTISKID DEVICE WITH SAFETY APPARATUS

[72] Inventors: Toshiaki Okamoto; Masami Inada; Koziro Mori, all of Toyota-shi, Japan

[73] Assignee: Aisin Seiki Company Limited, Toyota-shi, Aichi-ken, Japan

[22] Filed: Dec. 31, 1969

[21] Appl. No.: 889,575

[52] U.S. Cl. .......................303/21 AF, 188/181 R, 303/20, 340/52 R
[51] Int. Cl. ...........................................................B60t 8/00
[58] Field of Search ....................73/518; 116/18, 22, 28, 37; 188/181; 303/19, 20, 21, 27; 340/52; 324/181

[56] References Cited

UNITED STATES PATENTS

| 3,516,715 | 6/1970 | Fielek, Jr. et al. | 303/21 AF |
| 3,494,671 | 2/1970 | Slavin et al. | 303/21 P |
| 3,398,995 | 8/1968 | Martin | 303/21 BE |
| 3,414,336 | 12/1968 | Atkin et al. | 303/21 F |

Primary Examiner—Milton Buchler
Assistant Examiner—Stephen G. Kunin
Attorney—Cumpston, Shaw & Stephens

[57] ABSTRACT

An apparatus for performing antiskid brake pressure control operation characterized by the provision of an alarm apparatus adapted for ignition upon reception of a brake pressure-reducing instruction signal extending beyond a predetermined period.

19 Claims, 6 Drawing Figures

Patented March 21, 1972 3,650,574

AUTOMOTIVE ANTISKID DEVICE WITH SAFETY APPARATUS

This invention relates generally to improvements in and relating to an antiskid hydraulic braking technique. More specifically, it relates to improvements for providing safety measure when the antiskid mechanism is subjected to failure of proper functioning on account of occasionally and unintentionally invited defective sealing, defective electric and/or electronic elements or the like.

In order to assure correct and safe functioning of antiskid mechanisms employed in the recently developed modern automotive hydraulic brake systems, various safety measures have been proposed.

It is the main object of the invention to provide a positively and accurately functioning safety means adapted for providing a correct function even when the hydraulic brake pressure-reducing control means per se employed in the antiskid section of said braking system should be subjected to troubles.

It is a further object of the present invention to provide a reliable safety measure adapted for providing a proper function even if troubles are encountered in the various elements of an electric and/or electronic hydraulic brake pressure control means.

These and further objects, features and advantages of the invention will become more apparent when one reads the following detailed description of the invention with reference to the accompanying drawings which illustrate substantially a sole preferred embodiment of the invention.

Figure 1:
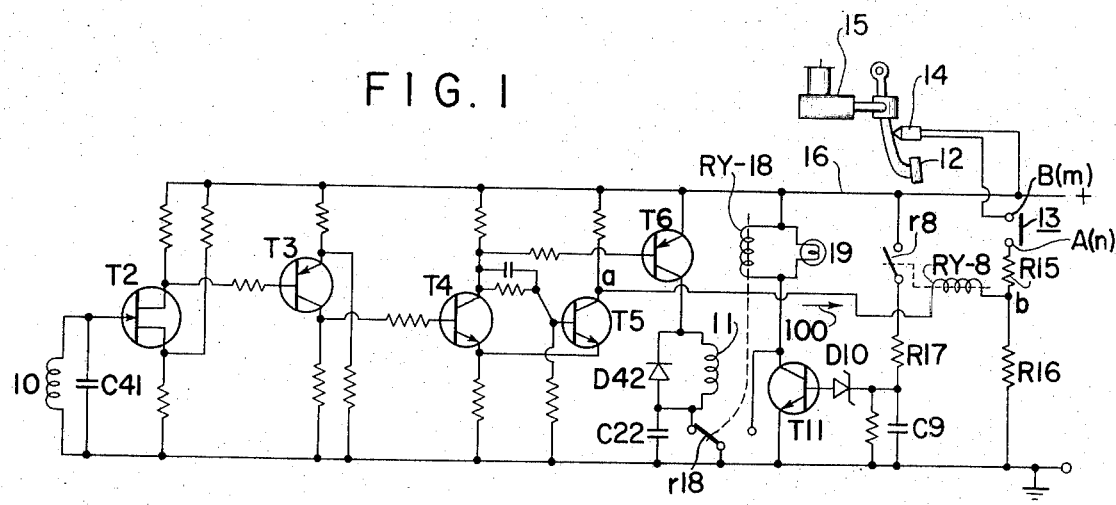
FIG. 1 is a connection diagram of a preferred embodiment of the electronic circuit employed in the sole embodiment arrangement of the invention.

Now referring first to FIG. 1, 10 denotes an AC generator which is mechanically connected or coupled with a any selected one of the four wheels of an automotive vehicle, although not specifically shown and the generator is shown highly in a simplified way in the form of a single coil. The generator 10 generates at a certain selected time point a voltage which is in inversed relation with the angular deceleration degree of the vehicle wheel under consideration and as measured at the same instance.

As shown, a condenser C41 is connected in parallel with the generator 10. The voltage output from the generator 10 is fed to an amplifier circuit comprising a field-effect transistor T2 and a further transistor T3 connected with each other as shown.

A transistor T4 is connected electrically with the collector electrode of transistor T3 for the purpose of descriminating whether the amplified voltage exceeds a certain predetermined value or not, in cooperation with a still further transistor T5, said transistors T4 and T5 constituting a Schmitt circuit. These transistors are so designed and arranged that the transistor T4 is normally nonconductive, while the transistor T5 is conductive. When a voltage which exceeds the predetermined value is applied to the base of transistor T4; the latter will turn on and the companion transistor T5 becomes nonconductive.

The collector electrode of transistor T4 is electrically connected with a transistor T6 which is adapted to drive an electromagnetically operated solenoid valve 11, a diode D42 provided for protection of transistor T6 being inserted in parallel with said solenoid valve which has been shown only in a simplified way as a coil. One end of said solenoid of the electromagnetic valve 11 is connected to a condenser C22 for the protection of a relay $r18$ of a relay RY-18.

The collector electrode of transistor T5 is electrically connected with one end of a relay RY-8, the opposite end of which is connected with resistors R15 and R16 of which the latter resistor is connected to earth. The opposite end of the former resistor R15 is electrically connected through a pressure switch 13 to a stop switch 14 which is operatively connected with a conventional foot-actuated brake pedal 12 only schematically shown. This pedal is also connected mechanically with a conventional master cylinder 15, so as to accumulate therein a pressurized working liquid medium such as oil for supplying hydraulic braking pressure to be supplied to wheel brake cylinders for performing braking function to the vehicle wheels, as will be more fully described hereinafter with reference to FIG. 5.

The stop switch 14 is connected at its other terminal with the positive side of a DC power source, not shown.

Relay RY-8 is provided with a relay contact $r8$. When the relay is energized to close its contact $r8$. Upon closure of the relay contact $r18$, current will be conveyed from positive line 16 through the closed contact $r8$ to resistor R17 which is electrically with condenser C9 and the base electrode of a transistor T11 through Zener diode D10. When the transistor T11 turns on, current will flow through relay RY-18 and an alarm lamp 19.

Figure 2:
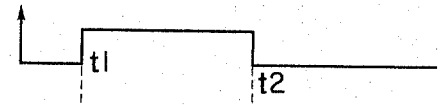
FIG. 2 is a potential curve appearing at a certain point $a$ in the circuit shown in FIG. 1 and being used as pressure-reducing instruction signal.

In FIG. 2, a representative form of the pressure reducing instruction signal in electrical potential appearing at a terminal $a$ as the output of transistor T5. The signal develops at a time point t1 and terminate at a certain time point $t2$.

Figure 3:
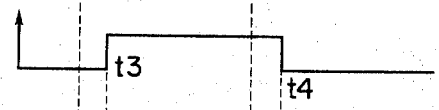
FIG. 3 is a potential curve appearing at a certain point $b$ relating to a pressure switch employed in the circuit shown in FIG. 1.

In FIG. 3, an electrical potential appearing at a terminal $b$ positioned as shown in proximity of pressure switch 13 which turns on at a time point $t3$ and becomes off at a certain time point t4.

Figure 4:
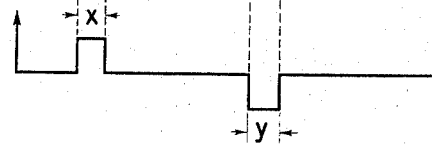
FIG. 4 is a curve illustrative of current pulses appearing at a relay RY-8 employed in the circuit shown in FIG. 1.

In FIG. 4, pulse currents are shown which will flow through the relay RY-8 upon delivery of a pressure-reducing instruction signal shown by way of example in FIG. 2. The pulselike current $x$ will continue to flow from the initiating time point $t1$ of the pressure-reducing instruction signal to the time point $t3$ where the pressure switch 13 turns on while the pulselike current $y$ will extend from the time point $t2$ where the instruction signal extinguishes to the time point $t4$ where the pressure switch turns off.

Figure 5:
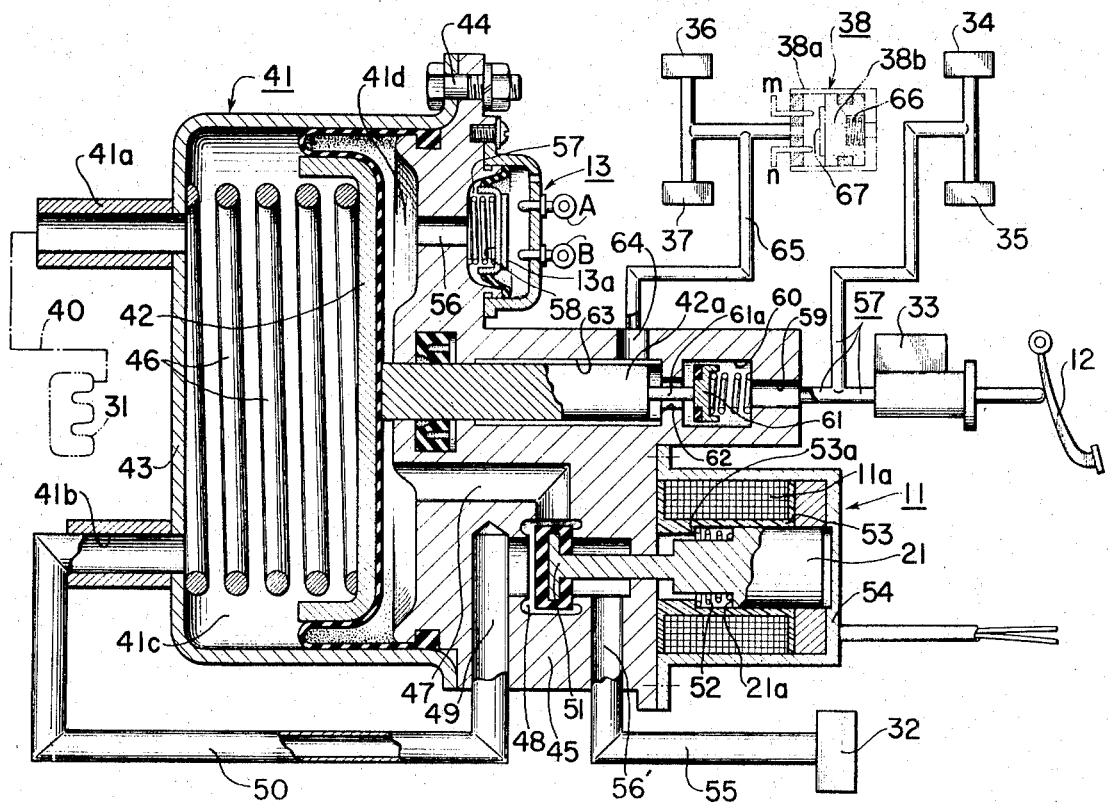
FIG. 5 is a schematic view of the sole embodiment arrangement of the invention, several parts being shown in section for better understanding of the nature of the invention.

In FIG. 5, a preferred arrangement for skid prevention and disablement alarming embodying the principles of the invention is shown.

In this figure, the numeral 31 denotes a conventional suction source, preferably an intake manifold of an automotive engine of a vehicle, not shown, which is fitted with a conventional hydraulic brake system, several working parts thereof being schematically shown in the figure. The suction source 31 is fluidically connected through a piping 40, only schematically shown with a single line, and an inlet socket 41a of a pressure modulator 41 of the pneumatic type, to a working chamber 41c thereof defined by a diaphragm piston 42 movably arranged within the interior space of a hollow main housing member 43 of the pressure modulator. The main housing member 43 is rigidly attached at its one end, more specifically right-hand end when seen in FIG. 5, by means of a plurality of fixing bolts 44 of which only one is shown, to a rigid main body member 45. Within the working chamber 41c, there is provided a return spring 46 tensioned between the end wall of said housing 43 and said diaphragm piston 42, thereby the latter being urged normally to move towards its right-hand end position as shown. A control chamber 41d is provided within the interior space of the housing 43 defined by diaphragm piston 42 and the left-hand or inner end of the main body member 45, said chamber 41d being normally kept in fluid communication with the working chamber 41c though duct 47, valve chamber 48, duct 49, piping 50 and a second socket 41b, as shown, said ducts 47, 49 and valve chamber 48 being formed in the main body member 45 and said socket 41b being attached fixedly to the main housing member 43 as in the case of the first socket 41a. Within the valve chamber 48, there is provided a control valve 51 which is mechanically connected with armature 21 of solenoid valve assembly 11 which is shown only schematically in the form of solenoid coil 11 in FIG. 1. Under normal or off-service conditions, the control valve 51 is positioned at its right-hand position for allowing the pneumatic communication of control chamber 41d with the working chamber 41c which is kept in vacuum by virtue of pneumatic communication with suction source 31. For this purpose, a return spring 52 is tensioned between a shoulder 21a on the armature 21 and a further shoulder 53a of a bobbin case 53 mounting the solenoid coil proper at 11a being encased in an auxiliary housing 54 which is fixedly attached to the main body member 45 by means of fixing bolts or the like means, although not specifically shown. When the solenoid coil 11 is energized, the armature 21 will be moved to the left-hand position in FIG. 5 so as to interrupt the normally established fluid communication between the both chambers 41c and 41d, and at the same time, newly to establish a fluid communication of an atmospheric air inlet 32 with said control chamber 41d. The inlet 32 is fluidically connected through a piping 55 with a duct 56' bored through the main body member 45, so as to connect fluidically the piping 55 with the valve chamber 48 when the control valve 51 is brought into its left-hand or working position. In the latter case, ambient atmospheric air will invade through said inlet 32, piping 55, duct 56', valve chamber 48 and duct 47 into control chamber 41d. Thus, ambient air pressure prevails in this chamber 41d and a differential pressure will develop between the both chambers 41d and 41c so that the diaphragm piston 42 will be moved from the position shown in the left-hand direction against the action of return spring 46.

Brake pedal 12 and master cylinder 33 are also seen in FIG. 5. When the brake pedal 12 is actuated for performing a brake application, the thus pressurized hydraulic liquid is conveyed from the left-hand or outlet end of the master cylinder through a piping system generally denoted 57 to front wheel cylinders 34 and 35 for application of a boosted-up braking effort on the related or vehicle front wheels, not shown for simplicity. The numeral 38 denotes a hydraulically operated pressure switch which is arranged to sense the hydraulic brake pressure applied to rear wheel cylinders 36 and 37 arranged as conventionally to brake vehicle rear wheels, not shown. This hydraulic switch 38 functions in place of the aforementioned pressure switch 13.

The operation is as follows.

When the vehicle driver actuates the brake pedal with his lighter manual effort so that any skid phenomenon is not invited, the deceleration degree is such that the transistor T4 does not turn on, although the deceleration signal delivered from the generator 10 is amplified through transistors T2 and T3 and then applied to the base electrode of transistor T4 of the Schmitt circuit.

On the contrary, when the driver applies a considerable manual effort on the foot brake pedal 12 so that a large enough deceleration signal is sensed by and delivered from the generator 10 to make the transistor T4 to turn on, while the companion transistor T5 of the Schmitt circuit acting as an descriminator will turn off.

With the conduction of transistor T4, the transistor T6 will become also conductive so that current will be supplied to solenoid coil proper 11a is energized so as to shift the control valve 51 from the shown position to its working position as was already referred to. Thus, the diaphragm piston 42 together with its piston rod 42a is moved to left in FIG. 5. At the same time, atmospheric pressure is conveyed from control chamber 41d through a port 56 into an auxiliary valve chamber 57 defined by a small diaphragm piston 58, thus the latter being moved to right, so as to bring a conductive plate 13A into contact with both terminals "A" and "B" shown in FIG. 5, the plate 13A being fixedly mounted on the piston 58 as shown. By this function, the switch 13 shown in FIG. 1 is brought into its closed position.

At this stage, the potential of the pressure-reducing signal as measured at the point $a$ in FIG. 1 has a higher value, on account of the interrupted condition of transistor T5. The potential measured at the point $b$ in FIG. 1 at stage shows a higher value, on account of the closure of stop switch 14 and pressure switch 13 so that any current will not flow through relay RY-8.

With distinction of the pressure-reducing signal, transistors T4 and T6 will become non-conductive, while transistor T5 returns to its conductive state so that the solenoid valve 11 is brought into its off-service position shown. Therefore, armature or plunger 21 will returns to the position shown and air communication from air inlet 32 to control chamber 41d is interrupted again. The auxiliary diaphragm piston 58 will return to its offservice position shown under the influence of return spring 59. Thus, the pressure switch 13 is turned off.

At this stage, the potentials at the points $a$ and $b$ have respective lower values, and relay RY-8 will not be actuated.

Regardless of the pressure-reducing signal delivered or not delivered from the Schmitt circuit, and if the closed period of pressure switch 13 should exceed a predetermined value such as 0.3 seconds for adhesion coefficient between the wheels and the road surface being $\mu = 0.8$ corresponding the dry state of the road or one second for $\mu = 0.1$ which corresponds to the ice-covered state of the road, current will flow through the relay RY-8 in the direction, as shown by a small arrow in FIG. 1.

With energization of relay RY-8, its contact $r8$ is closed and current is fed through the thus closed relay contact and the resistor R17 so that a gradually increasing electrical charge is accumulated in the condenser C9 with relation the time as it progresses.

With continued duration of the charging period, the voltage will increase correspondingly and it is applied through Zener diode D10 to transistor T11 so as to ignite the alarm lamp 19. At the same time, the relay contact $r18$ of relay RY-18 is caused to open and the antiskid mechanism is brought into its off-service position and the whole hydraulic brake system is brought into its normal braking or non-skid-preventing service position. In this case, when the brake pedal actuated, the pressurized braking liquid is supplied from the outlet end of the master cylinder 33 through piping 57 to an inlet port 59 in the main body member 45 which port is kept in fluid communication with a small cylinder space 60 formed in the same member 45, said space 60 mounting therein a loosely slidable and spring-loaded valve piston 61 provided integrally with a pusher pin 61a passing through an intermediate port 62 and abutting against the outer end of the piston rod 42a which extends into a second or larger cylinder space 63. This space 63 is always kept in fluid communication with the first or small cylinder space 60 through said intermediate port 62; said space 63 being kept in fluid communication through a third or lateral port 64, if not the latter is closed by the piston rod 42a as shown and in case of no brake application. This port 64 is kept in communication through a piping 65 with rear wheel cylinders 36 and 37 adapted for applying brake upon the vehicle rear wheels not shown, so far as the piping 65 is fed with pressurized liquid delivered from the master cylinder 33. When brake pedal 12 is actuated, small piston is advanced fluidically leftwards in FIG. 5 and the diaphragm piston 42 together with its piston rod 42a is urged to move in the same direction against the action of return spring 46 for opening the lateral port 64. Thus, pressurized liquid may be conveyed from the piping 57 through port 59, chamber 60, port 62, right-hand end part of elongated cylinder space 63 and piping 65 to the rear wheel cylinders 36 and 37.

In such a case where in spite of non-delivery of a pressure-reducing signal, the pressure switch 13 is closed longer than a predetermined period such as 0.3 - 1.0 second, as was referred to hereinafter, by virtue of a certain accident, for instance, a considerable fluid leakage from the control chamber 41d, thus a reduced degree of vacuum prevailing therein, the potential at the point $a$ will be at a lower value on account of the conducting state of the transistor T5, while the potential at the point $b$ will be higher on account of the closed position of pressure switch 13. Therefore, current will flow through the relay RY-8 in the reverse direction as that shown by the small arrow 100, thus the relay contact $r8$ being closed. Therefore, as was referred to above, current will pass through Zener diode D10 and transistor T11 becomes conductive.

In this way, alarm lamp 19 is ignited and at the same time, relay contact $r18$ of the relay RY-18 is opened, so as to bring the antiskid mechanism into its off-service position. The whole braking action is therefore carried out in the regular way without inviting the antiskid operation. The provision condenser C22 serves for the protection of the relay contact $r18$.

In the arrangement shown in FIG. 5, hydraulically operated pressure switch 38 comprising and a cylinder 38a a piston 38b is provided in the brake oil piping 65 for the vehicle rear wheels. When a skid-phenomenon is sensed, the piston 38b is moved leftwards in the cylinder 38a under the influence of an actuating spring 66 and a conducting element 67 carried by the piston 38b is brought into bridging contact with terminals $m$ and $n$, thus the switch 38 being brought into its actuated position. Under normal braking conditions without skid-preventing function, these terminals $m$ and $n$ are kept in off-position.

Figure 6:
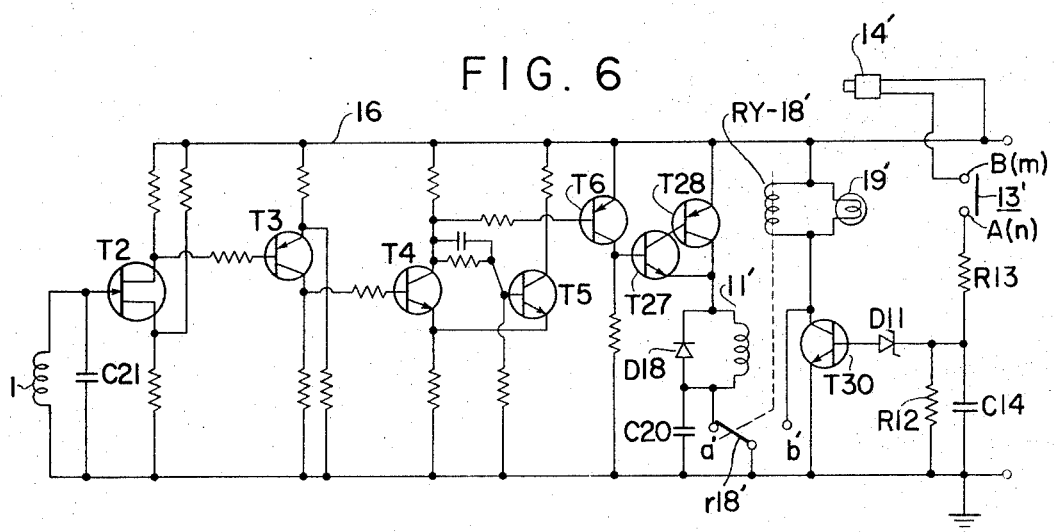
FIG. 6 is a connection diagram of a modified electronic circuit employed.

In FIG. 6, a modified electronic circuit from that shown in FIG. 1. As seen, those circuit elements which are denoted 10, C41, T2, T3, T4, T5, T6 and 16 are same as before.

Further circuit elements will be described hereinbelow simultaneously with the explanation of the function.

When a pressure-reducing signal is discriminated in the Schmitt circuit as before, transistor T4 turns on, and its output is amplified through transistors T6, T27 and T28, thereby an electromagnetic valve 11' which is similar to that denoted 11 in the foregoing being brought into actuation as before.

By the actuation of this solenoid valve 11', the pressure switch as its relay contact $r11$ being thereby closed. The conducting time duration of said pressure switch $r11$ is measured through resistors R12 and R13 and condenser C14 shown in FIG. 6. When the time duration is longer than predetermined value such as 0.3 - 1.0 second, the charge accumulated in the condenser C14 will become correspondingly high. Current is therefore conveyed through Zener diode D11 to transistor T30 which becomes now conductive. An alarm lamp 19' which is similar to that shown at 19 in the foregoing is ignited and at the same time, a contact $a'$ cooperable with relay contact $r18'$ of relay RY-18 is opened, and a contact $b'$ will become conducting. These points $a'$ and $b'$ may be deemed similar in their function with those denoted respectively $a$ and $b$ in the foregoing. At this stage, the main working operation will return to its normal one without performing skid prevention, while the lamp 19' will continue to illuminate.

Should there by any mechanic troubles in the sealing means such as control 51, diaphragm piston 42 or the like, and therefore when the solenoid valve 11 is brought into operation in spite of the absence of any skid, pressure switch 13 is closed and the alarm lamp 19 or 19' will be ignited for alarming the functional failure. In the similar manner, when an electric or electronic trouble such as unintentional earth connection of the base electrode of transistor T6 should be invited, the same transistor will become conducting and current will continue to flow therethrough, despite of the existence or non-existence of a pressure-reducing signal. In such case, the solenoid valve is actuated, so as to close the pressure switch 19 or 19' and the alarm lamp will continue to illuminate for alarming.

The embodiments of the invention in which an exclusive property or privilege is claimed are as follows:

1. In a method for performing antiskid brake pressure control in an automotive hydraulic brake system the improvement comprising the following steps: issuing a pressure-reducing instruction signal in response to a skidding condition of said brake; determining the time duration beginning from said issuance of the instruction signal for actuation of an electromagnetically operated valve means and ending to the actuation of a pressure switch, and issuing an alarm when said measured time period should exceed a predetermined value.

2. In a method for performing antiskid brake pressure control in an automotive hydraulic brake system, the improvement comprising the following steps: issuing a pressure-reducing instruction signal in response to a skidding condition of said brake; determining the time duration beginning from an extinguishing of the issued instruction signal for actuation of an electromagnetically operated valve means and ending to a termination of the actuation of a pressure switch, and issuing an alarm when said measured time period should exceed a predetermined value.

3. An apparatus for antiskid brake pressure control in a hydraulic wheel brake system of an automotive vehicle with wheels comprising in combination of:
   1. a sensor for sensing occasionally appearing lock-impending or already locked condition of one of said wheels;
   2. a pneumatic pressure-controlled electromagnetic valve means adapted for reducing the hydraulic brake pressure to said wheel in response to an instruction signal from said sensor;
   3. a pressure-detecting means for sensing said pneumatic pressure applied to said electromagnetic valve means and for producing an actuating instruction in response to said pneumatic pressure attaining a predetermined value;
   4. measuring means for measuring the time period from the initiation of said pressure-reducing instruction signal to the production of said actuating instruction signal; and
   5. alarm means for producing an alarm signal when said measured time period exceeds a predetermined value;

4. The apparatus as claimed in claim 3, further comprising a release means for bringing said electromagnetic valve means into its off-service position in response to actuating of said alarm means.

5. An apparatus for antiskid brake pressure control in a hydraulic wheel brake system of an automotive vehicle with wheels, comprising in combination:
   1. a sensor for sensing occasionally appearing lock-impending or already locked condition of one of said wheels;
   2. an electromagnetic valve means adapted for reducing the hydraulic brake pressure to the wheel for said wheel responsive to a pressure-reducing instruction signal from said sensor;
   3. a pressure-detecting means for sensing said hydraulic brake pressure as applied to said wheel cylinder and for producing a control signal in response to said sensed pressure attaining a certain predetermined value;
   4. measuring means for measuring the time period from the initiation of said pressure-reducing instruction signal to the production of said control signal; and
   5. alarm means for producing an alarm signal when said measured time period exceeds a predetermined value.

6. The apparatus as claimed in claim 5, further comprising a release means for bringing said electromagnetic valve means into its off-service position in response to actuation of said alarm means.

7. An apparatus for antiskid brake pressure control in a hydraulic wheel brake system of an automotive vehicle with wheels, comprising in combination of:
   1. a master cylinder;
   2. a wheel cylinder;
   3. an electromagnetic valve provided in a hydraulic circuit extending between said both cylinders for interrupting the hydraulic communication therebetween by a pressure-reducing instruction signal delivered upon sensing occasional lock-impending or already locked condition of one of said vehicle wheels and adapted for reducing thereby the hydraulic pressure being fed to said wheel cylinder, said electromagnetic valve being under the influence of a pneumatic pressure difference between two pneumatic chambers divided by a diaphragm;

4. a pressure-responsive switch adapted for sensing the pneumatic pressure prevailing in one of said pneumatic chambers and for delivery of an actuation instruction signal when said sensed pneumatic pressure exceeds a predetermined value;
5. an electronic circuit adapted for measurement of the time interval from issuance of said pressure-reducing instruction signal to delivery of said actuation instruction signal;
6. a second electronic circuit adapted for comparing said time interval with a predetermined value; and
7. an alarm means for issuance of an alarm signal when said measured time interval is longer than said predetermined value.

8. An apparatus for antiskid brake pressure control in a hydraulic wheel brake system of an automotive vehicle with wheels, comprising in combination of:
1. a master cylinder
2. a wheel cylinder;
3. an electromagnetic valve provided in a hydraulic circuit extending between said both cylinders for interrupting the hydraulic communication therebetween by a pressure-reducing instruction signal delivered upon sensing occasional lock-impending or already locked condition of one of said vehicle wheels and adapted for reducing thereby the hydraulic pressure being fed to said wheel cylinder;
4. a pressure-responsive switch provided in a hydraulic piping connecting said both cylinders and adapted for delivery of an actuation instruction signal upon sensing the hydraulic pressure being fed to said wheel cylinder when it becomes higher than a predetermined pressure level;
5. an electronic circuit adapted for measurement of the time interval from issuance of said pressure-reducing instruction signal to delivery of said actuation instruction signal;
6. a second electronic circuit adapted for comparing said time interval with a predetermined value.

9. An apparatus for antiskid brake pressure control in a hydraulic wheel brake system of an automotive vehicle with wheels, comprising in combination of:
1. a sensor for sensing occasionally appearing lock-impending or already locked condition of one of said wheels:
2. a pneumatic pressure-controlled electromagnetic valve means adapted for reducing the hydraulic brake pressure to the wheel cylinder for said wheel responsive to a pressure-reducing instruction signal from said sensor; 3. a a pressure-detecting means for sensing said pneumatic pressure as applied to said electromagnetic valve for producing an actuating instruction signal in response to said sensed pressure attaining a predetermined value;
4. measuring means for measuring the time period from the termination of said pressure-reducing instruction signal to production of said actuating signal; and
5. alarm means for producing an alarm signal when said measured time period exceeds a predetermined value.

10. The apparatus as claimed in claim 9, further comprising a release means adapted for bringing said valve into its off-service position in response to actuation of said alarm means.

11. An apparatus for antiskid brake pressure control in a hydraulic wheel brake system of an automotive vehicle with wheels, comprising in combination of:
1. a sensor for sensing occasionally appearing lock-impending or already locked condition of one of said wheels;
2. an electromagnetic valve means adapted for reducing the hydraulic brake pressure to the wheel cylinder for said wheel responsive to a pressure-reducing instruction signal from said sensor;
3. a pressure-detecting means for sensing said hydraulic brake pressure as applied to said wheel cylinder and adapted for producing a control signal when said sensed pressure reaches a predetermined value;
4. measuring means for measuring the time period from the termination of said pressure-reducing instruction signal to production of said control signal; and
5. alarm means for producing an alarm signal when said measured time period exceeds a predetermined value.

12. The mechanism as claimed in claim 1, further comprising a release means adapted for bringing said valve into its off-service position in response to actuation of said alarm means.

13. An apparatus for antiskid brake pressure control in a hydraulic wheel brake system of an automotive vehicle with wheels, comprising in combination of:
1. a master cylinder;
2. a wheel cylinder;
3. an electromagnetic valve provided in a hydraulic circuit extending between said both cylinders for interrupting the hydraulic communication therebetween by a pressure-reducing instruction signal delivered upon sensing occasional lock-impending or already locked condition of one of said vehicle wheels and adapted for reducing thereby the hydraulic pressure being fed to said wheel cylinder;
4. a pressure-responsive switch provided in said hydraulic circuit and adapted for sensing the hydraulic brake pressure being fed to said wheel cylinder and for delivery of an actuation instruction signal when said sensed hydraulic pressure attains a predetermined value;
5. an electronic circuit adapted for measurement of the time interval from termination of said pressure-reducing instruction signal to delivery of said actuation instruction signal;
6. a second electronic circuit adapted for comparing said time interval with a predetermined value; and
7. an alarm means for issuance of an alarm signal when said measured time interval is longer than the said predetermined value upon performing said comparison.

14. The apparatus as claimed in claim 13 including means for bringing said electromagnetic valve means into its off-service position upon issuance of said alarm signal for bringing said wheel cylinder to its regular braking condition.

15. An apparatus for antiskid brake pressure control in a hydraulic wheel brake system of an automotive vehicle with wheels, comprising in combination of;
1. a master cylinder;
2. a wheel cylinder;
3. an electromagnetic valve provided in a hydraulic circuit extending between said both cylinders for interrupting the hydraulic communication therebetween by a pressure-reducing instruction signal delivered upon sensing occasional lock-impending or already locked condition of one of said vehicle wheels and adapted for reducing thereby the hydraulic pressure being fed to said wheel cylinder said valve being under the influence of a pneumatic pressure difference between two pneumatic chambers divided by a diaphragm;
4. a pressure-responsive switch for sensing the control pneumatic pressure prevailing in one of said pneumatic chambers and adapted for delivery of an actuation instruction signal upon said sensed pneumatic pressure attaining a predetermined level;
5. an electronic circuit adapted for measurement of the time interval from termination of said pressure-reducing instruction signal to delivery of said actuation instruction signal;
6. a second electronic circuit adapted for comparing said time interval with a predetermined value; and
7. an alarm means for issuance of an alarm signal when said measured time interval is longer than the said predetermined value upon performing said comparison.

16. The apparatus as claimed in claim 15, including means for bringing said electromagnetic valve means into its off-service position upon issuance of said alarm signal for bringing said wheel cylinder to its regular braking condition.

17. In an apparatus for performing antiskid brake pressure control in an automotive hydraulic brake system, the improvements comprising in combination of:
1. electric means for issuing a signal representing an occasionally rapid angular deceleration of wheels of an automotive vehicle;

2. an amplifier electrically connected with said signal issuing means for amplifying said signal;
3. A Schmitt circuit comprising a pair of transistors and connected with said amplifier;
4. electromagnetically operated valve means inserted in said system for the control of braking pressure, said valve means being actuated by an instruction signal delivered from said Schmitt circuit;
5. an alarm means adapted for cooperation with said Schmitt circuit, said alarm means being actuated upon said signal exceeding a predetermined value; and
6. means for bringing said valve means into its off-service position upon actuation of said alarm means.

18. An apparatus for antiskid brake pressure control in a hydraulic wheel brake system of an automotive vehicle with wheels, comprising in combination of;
1. a master cylinder;
2. a wheel cylinder;
3. an electromagnetic valve provided in a hydraulic circuit extending between said both cylinders for interrupting the hydraulic communication therebetween by a pressure reducing instruction signal delivered upon sensing occasional lock-impending or already locked condition of one of said vehicle wheels and adapted for reducing thereby the hydraulic pressure being fed to said wheel cylinder, said valve being under the influence of a pneumatic pressure difference between two pneumatic chambers divided by a diaphragm;
4. a pressure-responsive switch for sensing the control pneumatic pressure prevailing in one of said pneumatic chambers and adapted for delivery of an actuation instruction signal upon said sensed pneumatic pressure attaining a predetermined level;
5. measuring means adapted for measuring the operational time period of said pressure-responsive switch; and
6. an alarm means operatively connected with said measuring means and adapted for delivery of an alarm signal when said operational time period is longer than a predetermined value.

19. An apparatus for antiskid brake pressure control in a hydraulic wheel brake system of an automotive vehicle with wheels, comprising in combination of:
1. a master cylinder;
2. a wheel cylinder;
3. an electromagnetic valve provided in a hydraulic circuit extending between said both cylinders for interrupting the hydraulic communication therebetween by a pressure-reducing instruction signal delivered upon sensing occasional lock-impending or already locked condition of one of said vehicle wheels and adapted for reducing thereby the hydraulic pressure being fed to said wheel cylinder, said valve being under the influence of a pneumatic pressure difference between two pneumatic chambers divided by a diaphragm;
4. a pressure-responsive switch for sensing the hydraulic pressure being delivered to said wheel cylinder and adapted for actuation upon said sensed pressure attaining a predetermined value;
5. measuring means adapted for measurement of the duration period of said switch when it is actuated; and
6. an alarm means operatively connected with said measuring means and adapted for delivery of an alarm signal when the said actuating period becomes longer than a predetermined value.

* * * * *